United States Patent [19]

Levy-Joseph

[11] Patent Number: 4,519,622
[45] Date of Patent: May 28, 1985

[54] CARRIER TROLLEY, ESPECIALLY FOR CUSTOMERS OF SELF-SERVICE STORES

[75] Inventor: Marc Levy-Joseph, Strasbourg, France

[73] Assignee: Ateliers Reunis, Schiltigheim, France

[21] Appl. No.: 556,903

[22] Filed: Dec. 1, 1983

[30] Foreign Application Priority Data

Dec. 2, 1982 [FR] France ................. 82 20184

[51] Int. Cl.³ .............................................. B62B 11/00
[52] U.S. Cl. ......................... 280/33.99 S; 280/DIG. 4
[58] Field of Search ................. 280/33.99 R, 33.99 C, 280/33.99 H, 33.99 S, 33.99 T, DIG. 4, 33.99 A

[56] References Cited

U.S. PATENT DOCUMENTS 3,015,494  1/1962  Fosbrook, Sr. ............. 280/33.99 A
4,325,561  4/1982  Lynn ........................... 280/33.99 R
4,335,892  6/1982  Berlin ......................... 280/33.99 R

FOREIGN PATENT DOCUMENTS 591234   1/1933  Fed. Rep. of Germany .
2488561  2/1982  France .

Primary Examiner—Joseph F. Peters, Jr.
Assistant Examiner—Michael Mar
Attorney, Agent, or Firm—Young & Thompson

[57] ABSTRACT

The base frame of the trolley is constituted by two elbowed side members of wire joined together by horizontal cross-members. On each side of a top portion fixed against the underside of the carrier basket, the side members are provided with a sloping front portion and a sloping rear portion. The sloping front portion is capable of nesting beneath the carrier basket of a similar trolley at the time of interengagement of two trolleys in order to slide against the rear cross-member of the base frame of the trolley located in front, thereby causing an upward displacement of the rear end of the front trolley at the end of the nesting movement, the rear wheels of which are lifted off the ground.

3 Claims, 4 Drawing Figures

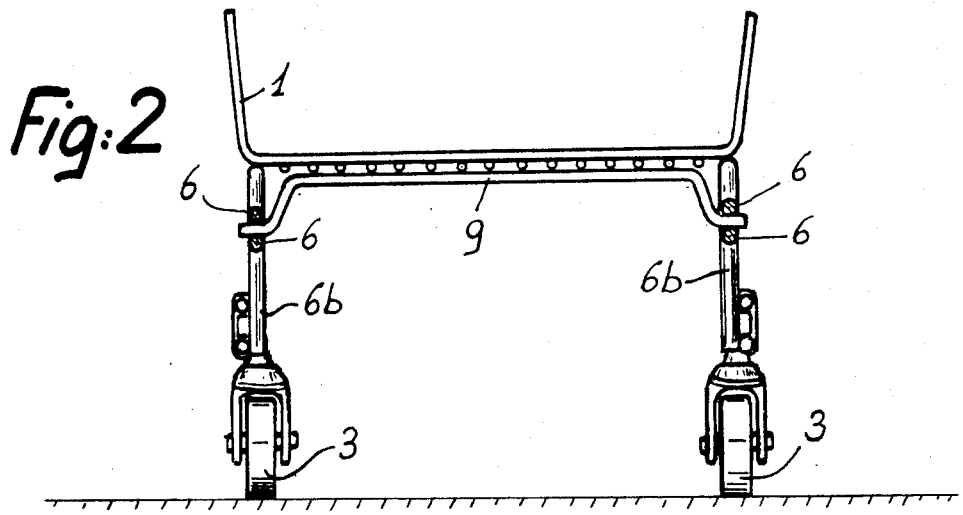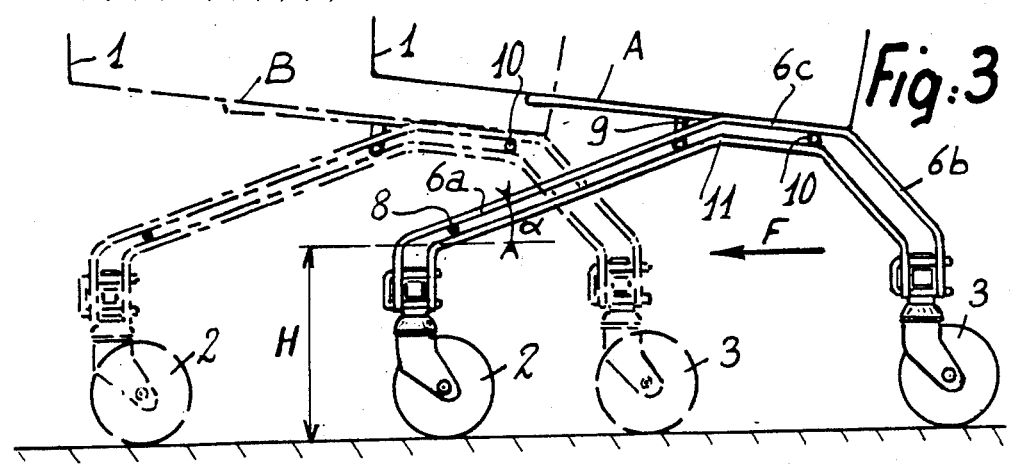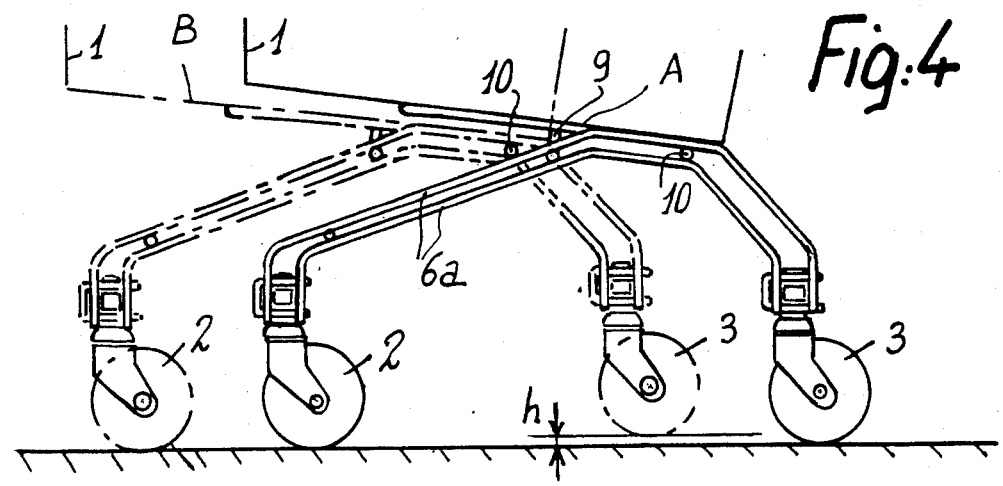

CARRIER TROLLEY, ESPECIALLY FOR CUSTOMERS OF SELF-SERVICE STORES

This invention relates to carrier trolleys which are intended to be pushed by their users and operated by hand.

In more precise terms, the invention relates to trolleys placed at the disposal of customers of self-service stores for transporting selected products and merchandise. Trolleys of this type consist of a large carrier basket located at a predetermined height with respect to a base frame on which the wheels are fixed, an operating handle-bar being provided at the top rear end of the trolley.

In order to reduce the bulk of trolleys when they are placed in readiness for use, they are usually designed so as to fit one inside the other. To this end, the rear vertical wall of the carrier basket is constituted by a flap which is hinged along its top edge and can thus be lifted in order to permit engagement of the front end of the carrier basket of another trolley. The base frame of a self-service trolley also has a shape which permits nesting of a number of trolleys by engagement of the front end of each trolley within the rear end of another trolley.

In order to facilitate the combined displacement of an entire row or "train" of interengaged trolleys, it has already been proposed to provide means for lifting the rear wheels of each trolley except for those of the trolley located at the rear end of the train. Such lifting means can consist of ramps and stops so arranged that the engagement of one trolley within another similar trolley placed in front automatically causes the rear wheels of this latter to lift. However, the means at present contemplated for this purpose consist of additional accessories which have to be manufactured separately, then mounted and fixed in position on the corresponding trolleys, thus substantially increasing the cost price of the trolley.

Furthermore, it proves necessary to guard against any possibility of placing merchandise on the base frame with a view to concealment from checkout at the level of the cash registers. To this end, it has already been proposed to equip said base frames with a forwardly inclined ramp or to construct them by means of side members which are also inclined in the forward direction. Again in this case, however, the solutions contemplated at the present time do not prove entirely satisfactory.

In point of fact, the addition of a ramp on a conventional base frame has the effect of increasing the cost price of the trolley. Furthermore, when trolleys are so designed that the side members of the base frame are inclined in the forward direction, said members in that case consist of large-section metal tubes in order to provide a sufficient degree of strength. However, this is attended by a certain number of drawbacks. Among others, the bending radius of tubes is greater than in the case of wires, which is a cause of difficulty from the manufacturing standpoint. Furthermore, in order to permit interengagement of trolleys, the angle made between the side members must necessarily be larger than in the case of side members of wire.

The object of this invention is therefore to provide a trolley which is so designed as to circumvent these various drawbacks while combining the advantages of both types of trolleys recalled in the foregoing, namely the following:

a possibility of interengagement accompanied by lifting of the rear wheels, prevention of any possibility of placing merchandise on the base frame.

To this end, the essential feature of the trolley according to the invention lies in the fact that its base frame is constituted by two elbowed side members of wire joined together by horizontal cross-members including one cross-member located near the rear edge of the bottom of the carrier basket. Said side members are provided on each side of a top portion which is fixed against the underside of the bottom of the carrier basket with a sloping front portion which is inclined at an angle within the range of 10 to 20 degrees and the downwardly elbowed front end of which carries the front wheels, and with a downwardly directed rear portion for carrying the rear wheels. Furthermore, the sloping front portion of said base frame is capable of engaging beneath the carrier basket of a similar trolley at the time of engagement of the front end of one trolley in the rear end of another trolley in order to slide against the rear cross-member of the base frame of the front trolley, thereby lifting the rear end of said front trolley at the end of the movement and lifting its rear wheels off the ground.

Thus the means for lifting the rear portion of each trolley are not constituted by added components but consist of elements which necessarily form part of the actual structure of the trolley, that is:

on the one hand the sloping front portion of the side members of the base frame, on the other hand the cross-member provided at the top portion of said side members near the rear end of the carrier basket.

This is therefore one obvious advantage of said trolley. Another advantage lies in the fact that the base frame of the trolley is made up of wires and not tubing although its side members are downwardly inclined towards the front end.

According to a further distinctive feature of the trolley under consideration, another cross-member of wire is placed between the two side members of the base frame in the top portion of said side members but at an appreciable distance forward with respect to the rear cross-member. This front cross-member is so arranged as to constitute in addition a stop which limits the extent of interengagement of the trolleys.

Other features of the trolley according to the invention will be more apparent upon consideration of the following description and accompanying drawings, wherein:

FIG. 2 is a vertical sectional view taken along a transverse plane which passes through the line II—II of FIG. 1;

FIG. 3 is a partial view in side elevation showing two trolleys according to the invention at the beginning of engagement one within the other;

FIG. 4 is a similar view showing the same trolleys in the fully engaged position.

Figure 1:
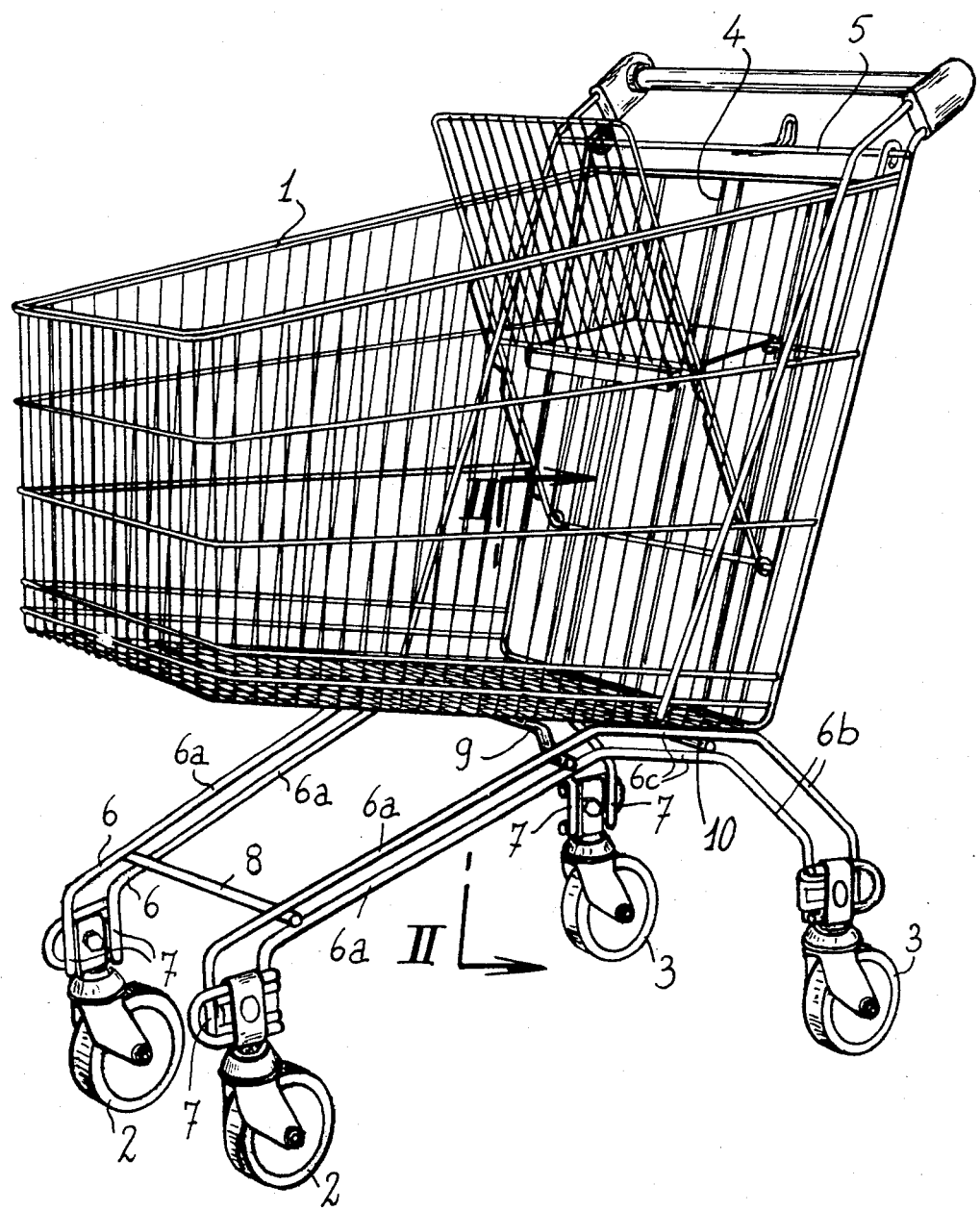
FIG. 1 is a view in perspective showing a trolley according to the invention.

The trolley according to the invention comprises in known manner a carrier basket 1, the bottom of which is located at an appreciable height above ground which may be within the range of 35 to 45 centimeters, for example. Said carrier basket is supported by a base frame mounted on four wheels, namely two swiveling wheels or casters 2 at the front end and two non-swiveling wheels 3 at the rear end. In order to permit engagement of another trolley, the rear wall is constituted by a flap 4 which is also made of wire and pivotally mounted on a hinge-pin 5 at the top end. In accordance with known arrangements suited to particular requirements, the flap 4 can be adapted to carry other articulated elements which can serve as baby seats as in the case of the example shown in the figure.

In accordance with the essential feature of the object of the invention, the base frame is constituted by two side members each formed by two parallel wires 6. These wires are elbowed in such a manner as to have three distinct portions in addition to their end portions 7 which extend vertically so as to permit the attachment of devices for mounting the corresponding wheels. The three distinct portions thus provided are respectively as follows:

a front portion 6a which slopes down towards the front end;

a rear portion 6b which slopes down towards the rear end;

an intermediate portion 6c which is fixed against the bottom of the carrier basket 1.

The front portion 6a of the two side members extends beneath a substantial length of the carrier basket 1. Thus, if the front wheels are located vertically beneath the front end of said basket, the front portion of said side members can extend over approximately two-thirds of the total length of the carrier basket 1.

In regard to the intermediate portion 6c, this portion extends beneath the remainder of the total length, that is to say one-third in the example contemplated in the foregoing. Finally, the rear portion 6b extends beyond the rear end of said carrier basket.

By virtue of the presence of the elbowed portion 7 which extends vertically to a predetermined height above the location of the front wheels 2, the front end of the sloping portion 6a of the side members is located at a height H which is relatively substantial and can be of the order of 20 to 25 centimeters, for example. Under these conditions, the angle of inclination $\alpha$ of said sloping portion 6a of the side member is relatively small and may have a value within the range of 10° to 20°, for example, while maintaining the bottom of the carrier basket 1 at its usual level, namely a height of approximately 35 to 45 centimeters with respect to the ground. A slope of this order is wholly sufficient to prevent any possibility of placing merchandise on top of the base frame. The angle of inclination thus given to the side members is also advantageous for lifting the rear ends of trolleys at the time of interengagement as will be described hereinafter.

In the front portion 6a of the side members as well as in the intermediate portion 6c, the spacing between the two wires constituting each side member is equal to the thickness of the wires which serve as spacer members between said side members. Thus the ends of said spacer members can be welded between the two corresponding wires.

In the example shown in the drawings, provision is made for three cross-members as follows:
a front cross-member 8,
an intermediate cross-member 9,
a rear cross-member 10.

The front cross-member 8 is located at the front end of the sloping portion 6a of the side members. The rear cross-member 10 is placed near the rear end of the carrier basket 1. These two cross-members consist of rectilinear wires.

As far as the intermediate cross-member 9 is concerned, this member is placed at a short distance ahead of the elbow 11 which is located between the sloping front portion 6a of the side members and the intermediate portion 6c of these latter. Under these conditions, said cross-member is placed against the bottom of the carrier basket 1 in an area which is not in contact with the side members of the base frame. However, since one of the functions of said cross-member is that of an additional support for the bottom of the carrier basket, said cross-member is welded against the underface of the basket and is provided at each end with a double elbow or crank forming a downward section followed by a horizontal section welded between the wires of the side members in the portion 6a of these latter. However, as will be explained below, said cross-member 9 has a second function in that it serves as a stop for limiting the extent of interengagement of the trolleys.

As far as the rear cross-member 10 is concerned, this member is capable of serving as a bearing member for the sloping front portion 6a of a trolley which is engaged at the rear in order to permit lifting of the rear end of the trolley to which said cross-member belongs. In fact, the front portion 6a of the side members of each trolley is intended to serve as a lifting ramp at the time of engagement of two trolleys A and B one inside the other.

As shown in FIG. 3, the interengagement of two trolleys is carried out by engaging the front end of the carrier basket 1 of the rear trolley A within the rear portion of the basket of the front trolley B. The sloping portion 6a of the side members of the base frame of the rear trolley A is then placed beneath the rear cross-member 10 of the base frame of the front trolley B.

By continuing the movement of engagement of the rear trolley A in the direction of the arrow F, the sloping front portion 6a of the side members of said trolley comes into contact with the cross-member 10 of the front trolley B and, at the end of the movement, causes the rear wheels of the front trolley to move upwards to a height h above the ground (as shown in FIG. 4). However, the front wheels 2 of the front trolley remain in contact with the ground. In order to achieve this result, it should be ensured that the cross-member 10 is placed to the rear of the center of gravity of each trolley.

A point worthy of note is that the intermediate cross-member 9 of the base frame of the rear trolley then constitutes a stop which limits the extent of engagement of said trolley within the trolley B. On completion of the movement of engagement, said cross-member in fact comes into abutting contact with the rear end of the carrier basket 1 of the front trolley B, as is apparent from FIG. 4. This avoids any danger of jamming of trolleys within each other.

When stand-by trolleys are engaged within each other so as to form a train, the rear wheels 3 of all the trolleys are lifted above the ground except for the rear wheels of the trolley located at the rear end of the train. By means of this arrangement, the entire train of trolleys can readily be displaced as a single unit simply by maneuvering the rearmost trolley. The ease of handling thus achieved is particularly advantageous in the case of trolleys having rear wheels which are not capable of swiveling. However, this enhanced maneuverability is equally advantageous in the case of trolleys equipped with swiveling wheels both at the front and the rear.

A fact to be emphasized is that automatic lifting of the rear ends of the trolleys at the time of interengagement is obtained without any additional components designed to produce a lifting movement. It is in fact the front portion 6a of the side members of the base frame of each trolley which performs the function of a lifting ramp by producing action on the rear cross-member 10 of the trolley located immediately in front. This is therefore an advantage in regard to both capital cost and strength of the trolley.

However, the sloping front portion of the side members of the base frame plays a further part in preventing users from placing merchandise on top of the base frame of a trolley in an attempt to conceal them from view as they pass through checkout channels in front of cash registers.

A final point to be noted concerns the constructional design of the side members of the trolley in accordance with the invention. The superposed arrangement of two wire members provides considerable advantages in comparison with the prior art design in which side members were constructed by means of a single metal tube of larger cross-section. These advantages lie in the simplicity of manufacture of the base frame thus formed and in the fact that the sloping front portion of the side members can thus readily constitute a lifting ramp which is capable of applying an upward thrust on the rear cross-member of another trolley at the time of interengagement of said trolleys.

What is claimed is:

1. A wheeled carrier trolley, especially for customers of self-service stores, comprising a merchandise carrier basket supported by a base frame and located at a predetermined height with respect to the wheels, wherein said base frame is constituted by two elbowed side members of wire joined together by horizontal cross-members formed including one rear cross-member located near the rear edge of the bottom of said carrier basket, said side members being provided on each side with a top portion which is fixed against the underside of the bottom of the carrier basket, a sloping front portion which is inclined upwardly at an angle within the range of 10 to 20 degrees, a downwardly elbowed front end which carries the front wheels, and a downwardly directed rear portion for carrying the rear wheels, said sloping front portion being capable of nesting beneath the carrier basket of a similar trolley at the time of interengagement of two trolleys in order to slide against the rear cross-member of the base frame of the trolley located in front, thereby causing an upward displacement of the rear end of the front trolley at the end of the nesting movement, the rear wheels of which are lifted off the ground.

2. A carrier trolley according to claim 1, wherein a front cross-member is fixed against the bottom of the carrier basket in front of the elbow located between the sloping front portion of the side members and the intermediate portion of said side members, the ends of said cross-member being provided with downwardly directed cranked ends in order to be fixed on the side members of the base frame, said front cross-member being capable of serving as a stop for limiting the extent of engagement of said trolley into an identical trolley located in front.

3. A carrier trolley according to claim 1, wherein the side members of the base frame are formed by two parallel and superposed wires relatively spaced in their sloping front portion and in their top intermediate portion at a distance which corresponds to the diameter of the base-frame cross-members, the ends of said cross-members being engaged between said two wires and welded thereto.

* * * * *